(12) United States Patent
Kim et al.

(10) Patent No.: US 7,799,456 B2
(45) Date of Patent: Sep. 21, 2010

(54) RECHARGEABLE BATTERY WITH ELECTROLYTE INJECTION OPENING SEALING MEMBER

(75) Inventors: Yong-Sam Kim, Yongin-si (KR); Ki-Ho Kim, Yongin-si (KR); Hong-Sup Lim, Yongin-si (KR); Sang-Won Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 947 days.

(21) Appl. No.: 11/434,637

(22) Filed: May 15, 2006

(65) Prior Publication Data

US 2006/0257733 A1 Nov. 16, 2006

(30) Foreign Application Priority Data

May 16, 2005 (KR) .................. 10-2005-0040590

(51) Int. Cl.
*H01M 2/08* (2006.01)
(52) U.S. Cl. ........................ 429/185; 429/175
(58) Field of Classification Search ......... 429/122–254, 429/185, 175; 29/623.1–623.5
See application file for complete search history.

(56) References Cited

U.S. PATENT DOCUMENTS

| | | | | |
|---|---|---|---|---|
| 3,507,708 | A | * | 4/1970 | Vignaud ................... 429/86 |
| 4,913,986 | A | * | 4/1990 | Howard et al. ............ 429/90 |
| 2005/0037260 | A1 | * | 2/2005 | Shen ....................... 429/176 |

FOREIGN PATENT DOCUMENTS

| | | |
|---|---|---|
| CN | 86 2 04736 U | 8/1987 |
| CN | 1268777 A | 10/2000 |
| CN | 2701079 Y | 5/2005 |
| JP | 58-147165 (U) | 10/1983 |
| JP | 61-55863 | 3/1986 |
| JP | 2000-021437 | 1/2000 |
| JP | 2000-215883 | 8/2000 |
| JP | 2002-298832 | 10/2002 |
| JP | 2004-119329 | 4/2004 |
| JP | 2004-327453 | 11/2004 |
| JP | 2005-190776 | 7/2005 |
| KR | 1998-075541 | 11/1998 |

(Continued)

OTHER PUBLICATIONS

Machine Translation of JP-2004-119329 originally published Apr. 2004.*

(Continued)

*Primary Examiner*—Basia Ridley
*Assistant Examiner*—Jonathan G Leong
(74) *Attorney, Agent, or Firm*—Christie, Parker & Hale, LLP

(57) ABSTRACT

A rechargeable battery having an electrolyte sealing member covering and sealing the electrolyte injection opening. An electrode assembly includes a positive electrode, a negative electrode and a separator wound in a jelly roll configuration. A case houses the electrode assembly. A cap assembly is combined with the case to seal the case, the cap assembly including a positive terminal connected to the positive electrode and a negative terminal connected to the negative electrode. An electrolyte injection opening is formed on the case or the cap assembly. A groove is formed along a periphery of the electrolyte injection opening. An electrolyte sealing member engages the groove.

12 Claims, 6 Drawing Sheets

FOREIGN PATENT DOCUMENTS

| | | | |
|---|---|---|---|
| KR | 2003-0060484 A | | 7/2003 |
| KR | 20050036635 | * | 4/2005 |

OTHER PUBLICATIONS

Machine Translation of Patent Abstract and Representative Drawing of KR 2005-0036635 to Park et al. originally published Apr. 2005.*

Machine Translation of JP 2005-190776 to Mizuno et al. originally published Jul. 2005.*

English translation of abstract of Korean Patent Laid-Open Publication No. 1998-075541.

Korean Patent Abstracts for Publication No. 1020030060484 A; dated Jul. 16, 2003 in the name of Gi Beom Kim.

Patent Abstracts of Japan, Publication No. 61-055863, dated Mar. 20, 1986, in the name of Seiji Anzai et al.

Patent Abstracts of Japan, Publication No. 2002-298832, dated. Oct. 11, 2002, in the name of Ryuichiro Ebi et al.

Patent Abstracts of Japan, Publication No. 2004-119329, dated Apr. 15, 2004, in the name of Hideo Hagino et al.

Patent Abstracts of Japan, Publication No. 2004-327453, dated Nov. 18, 2004, in the name of Yoshiaki Izumi et al.

Patent Abstracts of Japan, Publication No. 2005-190776, dated Jul. 14, 2005, in the name of Hiroyuki Mizuno.

European Search Report dated Jul. 21, 2006, for EP 06113978.8, in the name of Samsung SDI Co., Ltd.

* cited by examiner

RECHARGEABLE BATTERY WITH ELECTROLYTE INJECTION OPENING SEALING MEMBER

CROSS-REFERENCE TO RELATED APPLICATION

This application claims priority to and the benefit of Korean Patent Application No. 10-2005-0040590 filed in the Korean Intellectual Property Office on May 16, 2005, the entire content of which is incorporated herein by reference.

BACKGROUND OF THE INVENTION

1. Field of the Invention

The present invention relates to a rechargeable battery. More particularly, the present invention relates to a rechargeable battery with an improved sealing structure of an electrolyte injection opening.

2. Description of the Related Art

Distinct from a primary battery, a secondary (rechargeable) battery can be repeatedly charged and discharged. Recently, researchers are developing high-power rechargeable batteries using non-aqueous electrolyte which has a high energy density.

Low-capacity batteries having a single battery pack are used as a power source for various portable electronic devices such as mobile phones and laptop computers. High-capacity rechargeable batteries formed using tens of battery cells connected to each other may be used as a power source for driving a motor in a device requiring high power, such as an electric vehicle.

A rechargeable battery includes an electrode assembly of a shape such as a jelly-roll configuration having a positive electrode and a negative electrode with a separator interposed between them, a case having a space for housing the electrode assembly, a cap plate combined with the case to seal the case, and a positive terminal and a negative terminal protruding toward the cap plate and electrically connected to the positive electrode and the negative electrode, respectively.

Rechargeable batteries are manufactured in diverse shapes, such as cylindrical shapes and prismatic shapes which are selected and used according to device requirements for a rechargeable battery.

The cap plate is welded onto the case to seal the case and an electrolyte injection opening is formed in the cap plate through which electrolyte solution is injected into the case. To prevent the electrolyte solution from leaking out of the case, an electrolyte sealing member is mounted on the electrolyte injection opening.

In conventional rechargeable batteries, a spherical electrolyte sealing member having a diameter larger than that of the electrolyte injection opening is mounted and pressed onto the circular electrolyte injection opening and fixed onto the cap plate by laser welding.

However, when the spherical electrolyte sealing member seals the electrolyte injection opening, as used in conventional rechargeable batteries, it is difficult to securely weld the electrolyte sealing member onto the cap plate because the upper surface of the electrolyte sealing member may not form an exact circle. Thus, a laser used for welding is not well irradiated onto the junction face. Further, when the electrolyte sealing member is inserted into the electrolyte injection opening and welded thereto, a portion between the electrolyte injection opening and the electrolyte sealing member may be smeared with electrolyte solution, thus deteriorating the weld. Poor welding may allow the electrolyte solution to leak out along the electrolyte injection opening causing a short-circuit.

SUMMARY OF THE INVENTION

One embodiment of the present invention provides a rechargeable battery having an improved sealing structure for an electrolyte injection opening by improving the structure of the electrolyte injection opening and an electrolyte sealing member for closing the electrolyte injection opening.

According to the embodiment of the present invention, a rechargeable battery is provided that includes a groove formed along a circumference of the electrolyte injection opening, and an electrolyte sealing member engaged with the groove and covering and sealing the electrolyte injection opening.

More specifically, a rechargeable battery is provided having an electrolyte sealing member covering and sealing the electrolyte injection opening. An electrode assembly includes a positive electrode, a negative electrode and a separator wound in a jelly roll configuration. A case houses the electrode assembly. A cap assembly is combined with the case to seal the case, the cap assembly including a positive terminal connected to the positive electrode and a negative terminal connected to the negative electrode. An electrolyte injection opening is formed on the case or the cap assembly. A groove is formed along a periphery of the electrolyte injection opening. An electrolyte sealing member engages the groove.

The electrolyte sealing member is welded to the cap plate at an edge of the groove distal from the electrolyte injection hole. The electrolyte injection opening may be formed to have a circular cross section.

The groove may be formed apart from the electrolyte injection opening by a predetermined distance, and the groove may be formed to contact the electrolyte injection opening.

The brim of the electrolyte sealing member may come on a same plane as the upper surface of the cap assembly.

The groove may be formed consecutively to have a loop structure.

The electrolyte sealing member may include a cover for closing the electrolyte injection opening and a rib which is protruded from the entire surface of the cover and engaged with the groove.

The rib may be formed consecutively along circumference of the cover.

The rib may be formed to have an external diameter corresponding to the external diameter of the groove.

The electrolyte sealing member may be press-fit into the groove.

The electrolyte sealing member may be engaged with the groove and the electrolyte sealing member may be fixed onto the case or the cap assembly by welding.

One side of the electrolyte sealing may be slanted from the upper surface of the electrolyte sealing member to a height corresponding to the case or the cap plate to form a slant face.

A welding part having a height corresponding to the depth of the groove may be formed to be extended outward from the side of the electrolyte sealing member.

A slant face may be formed along the side of the electrolyte sealing member from the upper surface of the electrolyte sealing member to the welding part.

A vent broken at a predetermined pressure may be formed in the electrolyte sealing member.

The vent may be formed in a depressed structure.

The rechargeable battery may be used for driving a motor.

DETAILED DESCRIPTION

Figure 1:
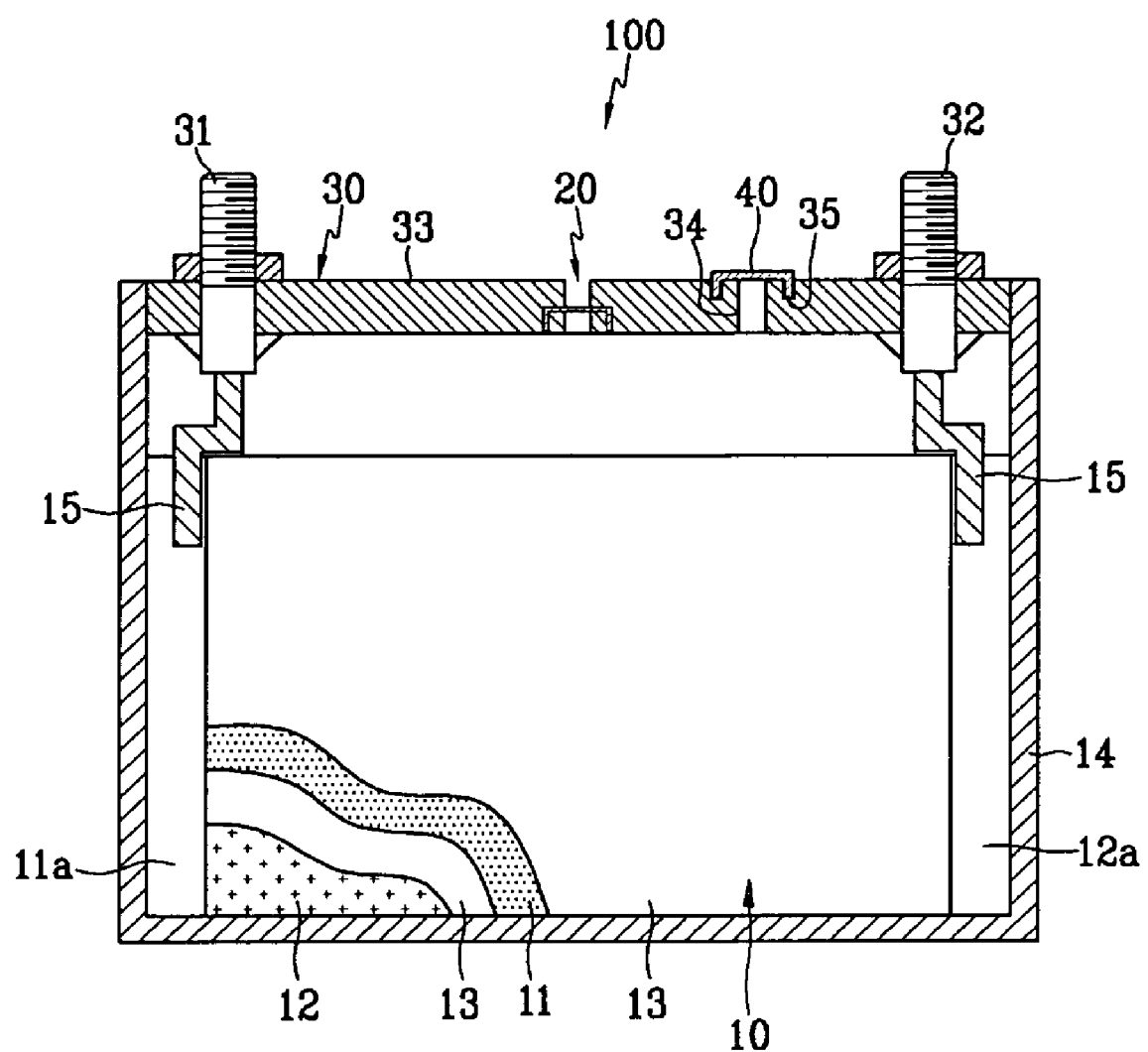
FIG. 1 is a cross sectional view showing a rechargeable battery in accordance with an exemplary embodiment of the present invention.

Referring to FIG. 1, a rechargeable battery 100 includes an electrode assembly 10 having a positive electrode 11 and a negative electrode 12 with a separator 13 interposed between them, a prismatic case 14 for housing the electrode assembly 10, a cap assembly 30 mounted on an opening of the case 14 and sealing the case 14, and a positive terminal 31 and a negative terminal 32 which are electrically connected to the positive electrode 11 and the negative electrode 12, respectively, through tabs 15. The positive and negative electrode taps protrude to the outside of the cap assembly 30.

The cap assembly 30 includes a safety vent 20 for exhausting gas generated by the rechargeable battery 100, an electrolyte injection opening 34 through which electrolyte solution is injected into the case 14, and an electrolyte sealing member 40 for sealing the electrolyte injection opening 34 to seal the case 14. The electrolyte injection opening 34 may be formed at one side of the cap assembly 30.

The case 14 may be formed of conductive metal such as aluminum, aluminum alloy and nickel-plated steel in the shape of hexahedron having an internal space for housing the electrode assembly 10 or another shape.

The present invention will be described by using a rechargeable battery having a prismatic shape as an example. However, the present invention is not limited to a prismatic shape, but rather, the present invention may be applied to rechargeable batteries of other shapes, such as a cylindrical shape.

The electrode assembly 10 is formed in the shape of a jelly roll by stacking the positive electrode 11 and the negative electrode 12 with the separator 13 and winding them together. Both the positive electrode 11 and the negative electrode 12 include a current collector coated with an active material.

An uncoated region 11a of the positive electrode and an uncoated region 12a of the negative electrode are positioned at either end of the electrode assembly 10 such that the uncoated regions 11a, 12a, one located on either side end of the case 14 when the cap assembly 30 are disposed in a vertical direction as shown in FIG. 1.

The positive terminal 31 and the negative terminal 32 are electrically connected to the uncoated region 11a of the positive electrode (positive uncoated region) and the uncoated region 12a of the negative electrode (negative uncoated region), respectively, through tabs 15 or current collecting plates.

The cap assembly 30 includes a cap plate 33 mounted on the upper part of the case 14. The positive terminal 31 and the negative terminal 32 mounted on either sides of the cap plate 33.

A safety vent 20 may be mounted on the cap plate 33 and the electrolyte injection opening 34 is spaced from the safety vent 20 by a predetermined distance.

The electrolyte injection opening 34 is sealed by the following structure in the present embodiment.

Figure 2:
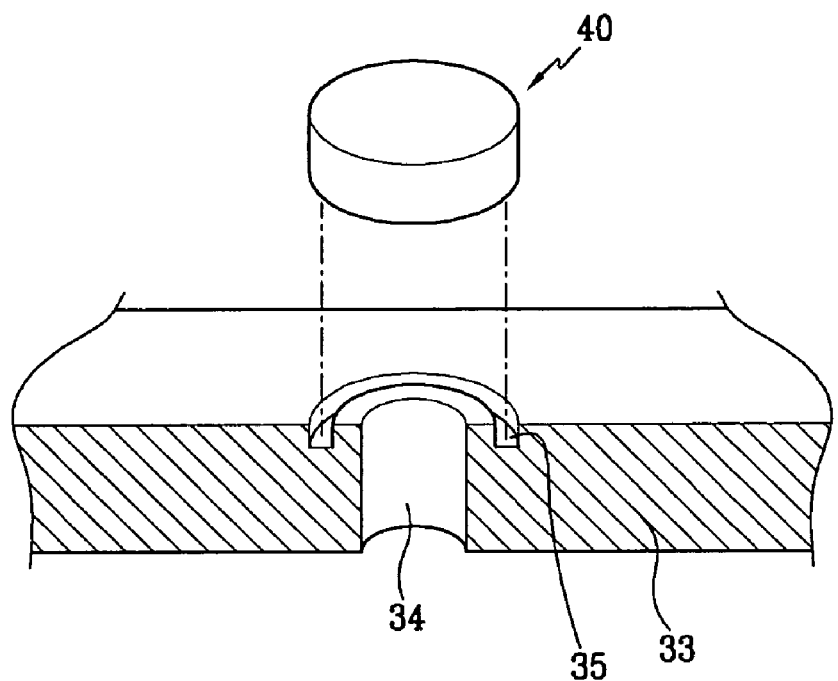
FIG. 2 is a partial perspective cross-sectional view showing a sealing structure of an electrolyte injection opening of the rechargeable battery in accordance with an exemplary embodiment of the present invention.

As shown in FIG. 2, the electrolyte injection opening 34 is formed in the cap plate 33 and a cross section of the electrolyte injection opening 34 is generally circular.

In an external surface of the cap plate 33, a groove 35 is formed around the periphery of the electrolyte injection opening 34, the groove being spaced a predetermined distance from the electrolyte injection opening 34. The groove 35 may be formed continuously to have a loop cross section. The size and the depth of the groove 35 may vary.

Figure 3:
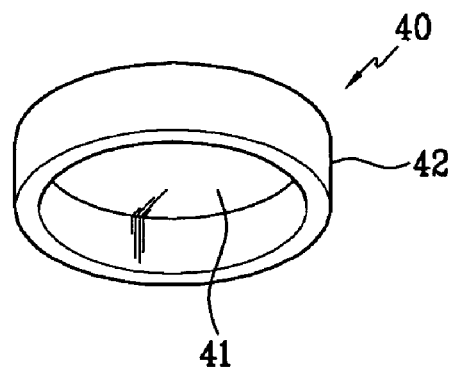
FIG. 3 is a perspective view showing a structure of an exemplary electrolyte sealing member of the present invention.

Referring to FIG. 3, an electrolyte sealing member 40 for sealing the electrolyte injection opening 34 includes a covering disc 41 for covering the electrolyte injection opening 34, and a rib 42 protruding from the periphery of the covering disc 41 perpendicularly to the covering disc 41. The rib 42 is integrated with the covering disc 41 and it is formed continuously along the circumference of the covering disc 41 to have a loop cross section. The rib 42 may have a diameter corresponding to a diameter of the groove 35 and is adapted to be inserted into the groove 35. A rib 42 formed to be wider than the width of the groove 35 may be press-fitted into the groove 35.

Even when the groove 35 and the rib 42 have different widths, the external diameter of the rib 42 may correspond to the external diameter of the groove 35. Thus, when the rib 42 is engaged with the groove 35, the circumferential surface of the groove 35 closely contacts the external circumferential surface of the rib 52.

As described above, the electrolyte sealing member 40 may be easily disposed in the electrolyte injection opening 34 since the rib 42 fits into the groove 35 formed along the circumference of the electrolyte injection opening 34. The electrolyte injection opening 42 is thus sealed when the rib 42 of the electrolyte sealing member 40 closes the electrolyte injection opening 34 and its circumference.

The material that forms the electrolyte sealing member 40 is not specifically limited and it may be the same material as that of the cap plate 33.

Figure 4:
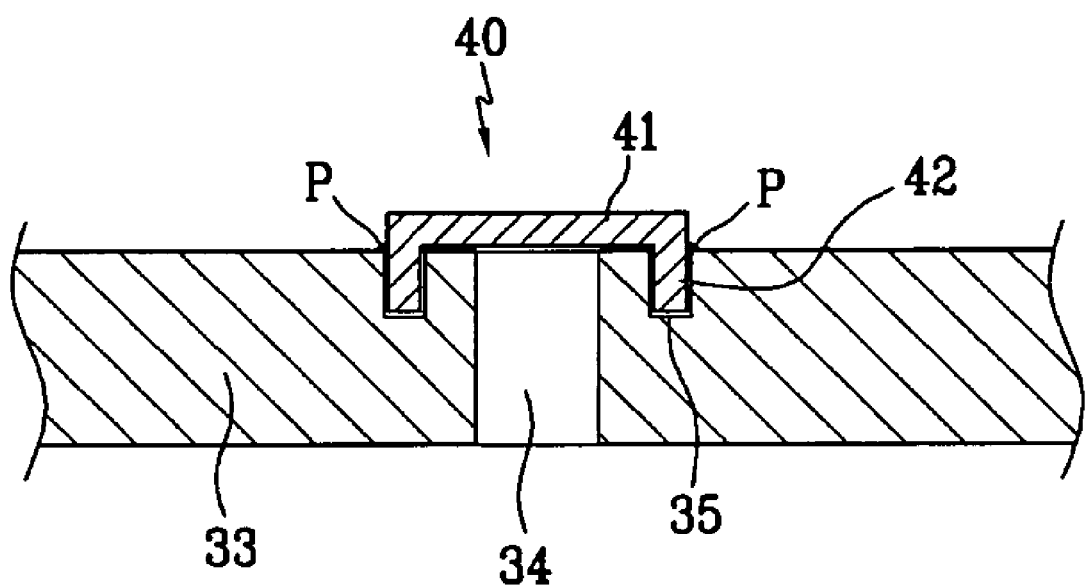
FIG. 4 is a cross-sectional view illustrating a sealed electrolyte injection opening of a rechargeable battery in accordance with an exemplary embodiment of the present invention.

Referring to FIG. 4, laser welding is carried out along the boundary (P) between the rib 42 and the cap plate 33 when the rib 42 is engaged with the groove 35 of the cap plate 33 to firmly fix the electrolyte sealing member onto the cap plate 33.

The boundary (P) may be spaced from the electrolyte injection opening 34 by a predetermined distance to prevent the weld from being degraded even if electrolyte solution is smeared onto the electrolyte injection opening 34. Thus, the electrolyte sealing member becomes firmly fixed onto the cap plate 33 and seals the electrolyte injection opening 34.

Figure 5:
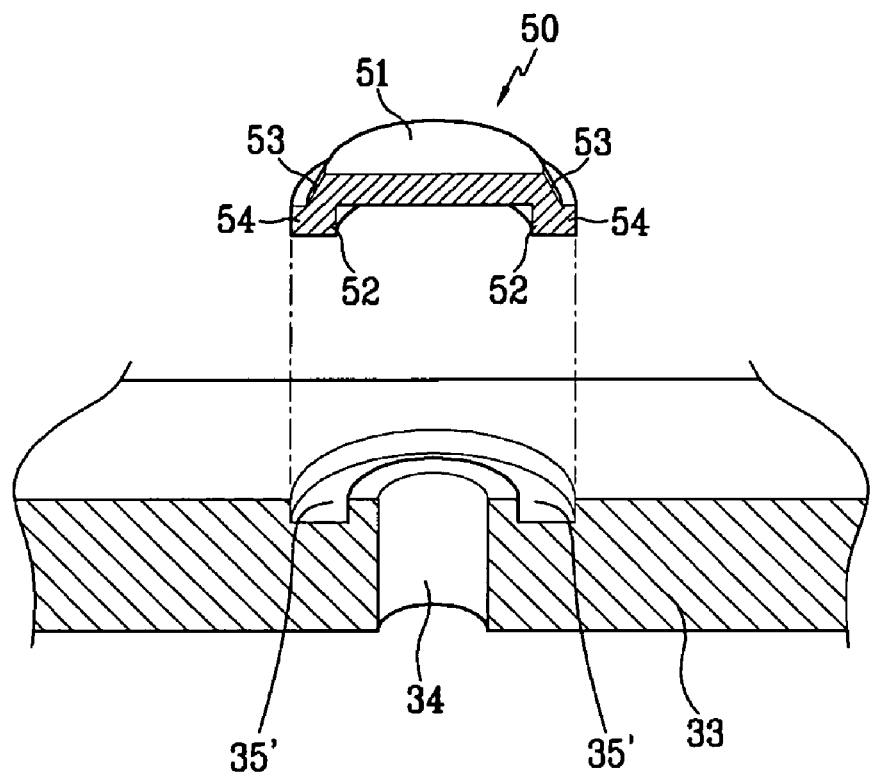
FIG. 5 is a partial perspective cross-sectional view showing a sealing structure of an electrolyte injection opening of a rechargeable battery in accordance with another exemplary embodiment of the present invention.
Figure 6:
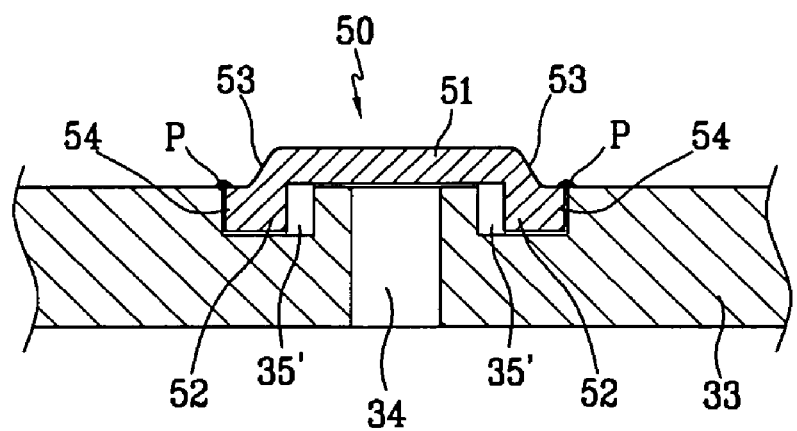
FIG. 6 is a cross-sectional view illustrating a sealed electrolyte injection opening of a rechargeable battery in accordance with another exemplary embodiment of the present invention.

FIGS. 5 and 6 illustrate a rechargeable battery in accordance with another exemplary embodiment of the present invention. Referring to FIGS. 5 and 6, the rechargeable battery of the present embodiment improves a weld by locating the welding surface between an electrolyte sealing member 50 and the cap plate 33 on the same plane.

More specifically, a groove 35' is formed as a loop along the circumference of the electrolyte injection opening 34 on the cap plate 33, and the groove 35' is formed spaced from the electrolyte injection opening 34 by a predetermined distance.

The electrolyte sealing member 50 engageable with the groove 35 includes a covering disc 51 for covering the electrolyte injection opening 34, and a rib 52 protruding along the entire external circumferential surface of the covering disc 51 and engageable with the groove 35.

This embodiment illustrates an electrolyte sealing member 50 having a covering disc 51 for sealing the electrolyte injection opening 34 having a circular cross section. However, the present invention is not limited to a circular shape, but rather the covering disc may be formed in diverse shapes depending on the cross-sectional shape of the electrolyte injection opening.

The rib 52 includes a welding portion 54 formed having a height generally corresponding to a depth of the groove 35 and extending from a side of the rib 52 to contact a side of the groove 35. The welding portion 54 has an external diameter corresponding to the external diameter of the groove 35. Thus, when the rib 52 is engaged with the groove 35, the external circumferential surface of the welding portion 54 contacts the surface of the groove 35.

The height of the welding portion 54 corresponds to the depth of the groove 35. Thus, when the rib 52 is engaged with the groove 35, laser welding may be performed easily along the boundary (P) between the rib 52 and the groove 35 which meet on the same plane. Also, the electrolyte sealing member 50 may be formed to be slanted at a predetermined angle from the upper part of the covering disc 51 to the welding portion 54 to provide a slanted face 53. Since the slanted face 53 more distinctly exposes the boundary (P) between the welding portion 54 and the cap plate 33, the laser welding may be performed more precisely.

Figure 7:
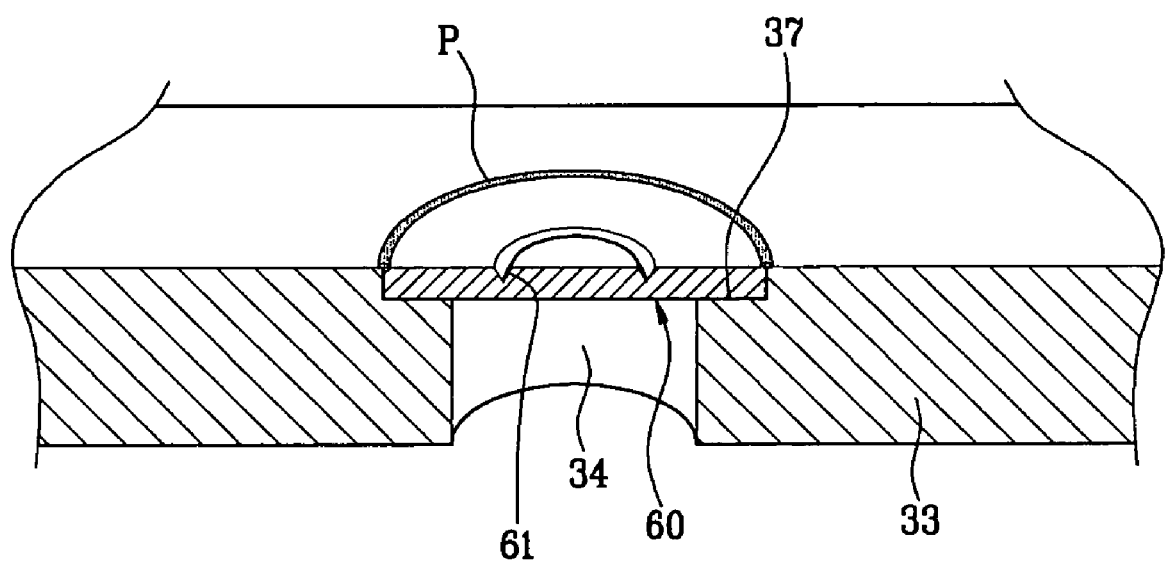
FIG. 7 is a partial perspective cross-sectional view showing a sealing structure of an electrolyte injection opening of a rechargeable battery in accordance with yet another exemplary embodiment of the present invention.

Referring to FIG. 7, the electrolyte injection opening 34 is formed in the cap plate 33. A groove 37 is formed in contact with the electrolyte injection opening 34 along the circumference of the electrolyte injection opening 34.

An electrolyte sealing member 60 is mounted on the groove 37 to seal the electrolyte injection opening 34. The electrolyte sealing member 60 is formed in the shape of a disc such that the external diameter of the electrolyte sealing member 60 is the same as or slightly larger than the diameter of the groove 37. Thus, when the electrolyte sealing member 60 is engaged with the groove 37, the groove 37 contacts the surface of the electrolyte sealing member 60.

The electrolyte sealing member 60 has a height about equal to the depth of the groove 37. When the electrolyte sealing member 60 is engaged with the groove 37, the electrolyte sealing member 60 and the cap plate 33 are on the same plane. Thus, the electrolyte sealing member 60 may be easily welded to the groove.

A vent 61 is formed on the surface of the electrolyte sealing member 60. The vent 61 is formed to have a lower shear strength than the electrolyte sealing member 60. Thus, the vent may be fractured at a predetermined pressure when the pressure increases inside the rechargeable battery. Since the vent 61 is recessed, it is thinner than the rest of the electrolyte sealing member 60. The vent 61 may be formed to have a cross section of a wedge or a notch. As stress is converged into the edge of the wedge, the vent 61 is easily fractured at the predetermined pressure.

Figure 8:
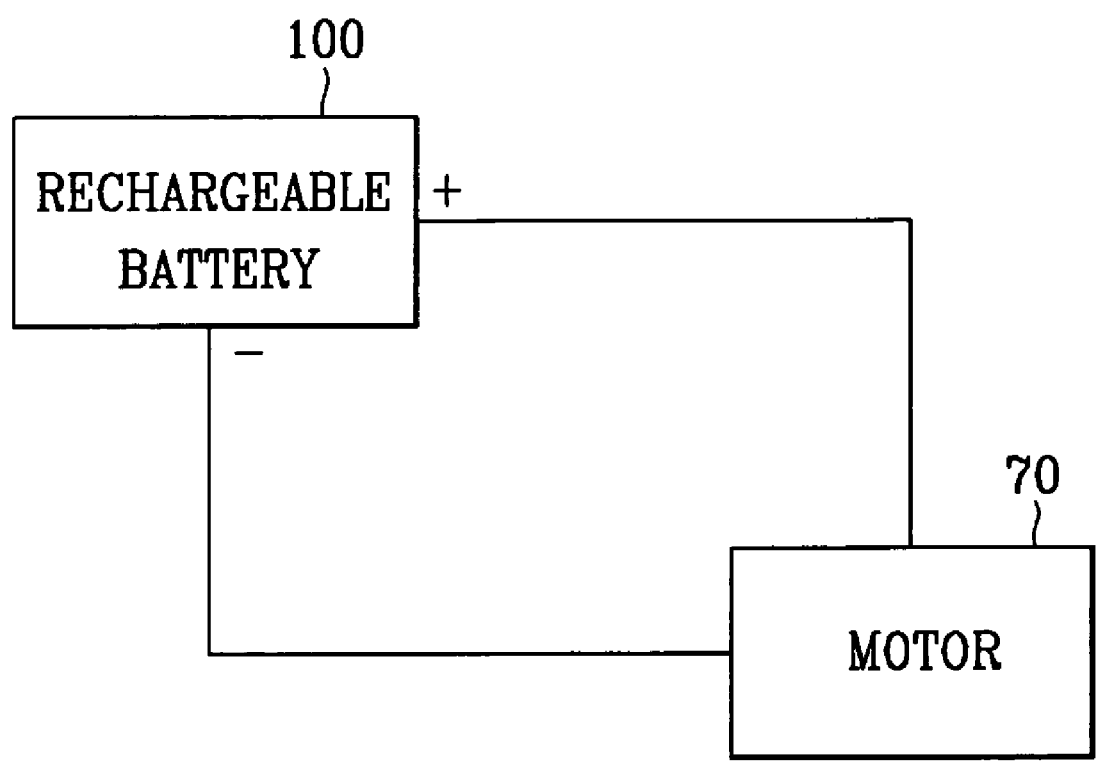
FIG. 8 is a block diagram schematically showing a rechargeable battery as a power source for driving a motor.

FIG. 8 is a block diagram schematically showing a state in which the rechargeable battery 100 shown in FIG. 1 is connected to a motor 70.

According to the above-described embodiments of the present invention, the electrolyte sealing member may be easily mounted on the electrolyte injection opening. The technology of the present invention simplifies the process of fabricating a rechargeable battery and increases the output.

Also, the technology of the present invention improves the sealing of rechargeable batteries by more securely combining the electrolyte injection opening to the electrolyte sealing member.

When the boundary between the electrolyte sealing member and the groove are on the same plane as the cap plate, the electrolyte sealing member and the groove may be easily welded. Also, when the vent is mounted to the electrolyte sealing member, there is no need to form an additional vent member, thus simplifying the rechargeable battery fabrication process.

The rechargeable batteries described above may be effectively used as batteries for hybrid electric vehicles requiring high power and high capacity. However, the usage of the rechargeable batteries is not limited to batteries for hybrid electric vehicles.

While this invention has been described in connection with what is presently considered to be exemplary embodiments, it will be understood that the invention is not limited to the disclosed embodiments, but, rather is intended to cover various modifications and equivalent arrangements included within the spirit and scope of the appended claims.

What is claimed is:

1. A rechargeable battery comprising:
   an electrode assembly including a positive electrode, a negative electrode and a separator between the positive electrode and the negative electrode;
   a case housing the electrode assembly;
   a cap assembly sealing the case, the cap assembly including a cap plate having a first surface and a second surface, a positive terminal connected to the positive electrode and a negative terminal connected to the negative electrode;
   an electrolyte injection opening extending from the first surface to the second surface of the cap plate assembly;
   a groove in the cap plate and extending around a periphery of the electrolyte injection opening, wherein a height of an outer wall of the groove and a height of an inner wall of the groove are substantially equal; and
   an electrolyte sealing member engaged with the groove and covering and sealing the electrolyte injection opening, wherein the electrolyte sealing member has a slanted face extending around a circumference of the electrolyte sealing member, wherein a portion of the electrolyte sealing member protrudes from the first surface of the cap plate, wherein the electrolyte sealing member is welded to the cap plate and wherein the electrolyte sealing member and the cap plate are made of substantially the same material.

2. The rechargeable battery of claim 1, wherein the electrolyte sealing member is welded to the cap plate at an edge of the groove.

3. The rechargeable battery of claim 1, wherein the electrolyte injection opening has a circular cross section.

4. The rechargeable battery of claim 1, wherein the groove is spaced from the electrolyte injection opening.

5. The rechargeable battery of claim 1, wherein a portion of an exterior surface of the electrolyte sealing member is substantially flush with the top surface of the cap assembly.

6. The rechargeable battery of claim 1, wherein the groove is a loop.

7. The rechargeable battery of claim 1, wherein the electrolyte sealing member comprises a cover sealing the electrolyte injection opening and a rib protruding from the surface of the cover and engaging the groove.

8. The rechargeable battery of claim 7, wherein the rib is continuous along a circumference of the cover.

9. The rechargeable battery of claim 7, wherein the rib has an external diameter substantially corresponding to an external diameter of the groove.

10. The rechargeable battery of claim 1, wherein the electrolyte sealing member is press-fit into the groove.

11. The rechargeable battery of claim 1, wherein the electrolyte sealing member comprises a rib having a height substantially corresponding to a depth of the groove.

12. The rechargeable battery of claim 1, wherein the rechargeable battery is configured to drive a motor.

* * * * *

UNITED STATES PATENT AND TRADEMARK OFFICE
CERTIFICATE OF CORRECTION

PATENT NO. : 7,799,456 B2
APPLICATION NO. : 11/434637
DATED : September 21, 2010
INVENTOR(S) : Yong-Sam Kim et al.

Page 1 of 1

It is certified that error appears in the above-identified patent and that said Letters Patent is hereby corrected as shown below:

In the Claims

Column 6, Claim 1, line 46          After "cap plate" Delete "assembly"

Signed and Sealed this
Twenty-seventh Day of December, 2011

David J. Kappos
*Director of the United States Patent and Trademark Office*